United States Patent
Nagai et al.

[11] Patent Number: 5,982,153
[45] Date of Patent: Nov. 9, 1999

[54] CHARGER SYSTEM SWITCHABLY CONNECTS A SMOOTHING CAPACITOR AND RESISTOR AND CHARGING CONTROLLER BASED ON A DETECTED SECONDARY BATTERY VOLTAGE

[75] Inventors: Tamiji Nagai; Toshitaka Takei, both of Kanagawa; Kuniharu Suzuki, Tokyo, all of Japan

[73] Assignee: Sony Corporation, Tokyo, Japan

[21] Appl. No.: 09/035,297

[22] Filed: Mar. 5, 1998

[30]     Foreign Application Priority Data

Mar. 13, 1997 [JP] Japan .................................. 9-059465

[51] Int. Cl.⁶ .............................. H02J 7/00; G05B 24/02; H02M 1/12
[52] U.S. Cl. ............................. 320/164; 323/354; 363/47
[58] Field of Search .................................. 320/162, 163, 320/164; 323/290, 354; 363/47, 208, 209

[56]          References Cited

U.S. PATENT DOCUMENTS

| | | | |
|---|---|---|---|
| 4,942,352 | 7/1990 | Sano | 320/164 |
| 5,396,164 | 3/1995 | Anegawa . | |
| 5,637,981 | 6/1997 | Nagai et al. | 320/160 |
| 5,659,237 | 8/1997 | Divan et al. | 320/119 |

FOREIGN PATENT DOCUMENTS

| | | |
|---|---|---|
| 0706253 | 10/1906 | European Pat. Off. . |
| 0311460 | 10/1988 | European Pat. Off. . |
| 2208192 | 8/1989 | United Kingdom . |
| 9708803 | 3/1997 | WIPO . |

*Primary Examiner*—Peter S. Wong
*Assistant Examiner*—Gregory J. Toatley, Jr.
*Attorney, Agent, or Firm*—Jay H. Maioli

[57]          ABSTRACT

A battery charging system detects a secondary battery terminal voltage and selectively controls a first switch to connect/disconnect a series-connected smoothing capacitor and resistor to ground to present an impedance greater than the battery impedance and further controls a second switch to connect/disconnect a charging control circuit in series between the voltage supply and the secondary battery being charged.

8 Claims, 7 Drawing Sheets

CHARGER SYSTEM SWITCHABLY CONNECTS A SMOOTHING CAPACITOR AND RESISTOR AND CHARGING CONTROLLER BASED ON A DETECTED SECONDARY BATTERY VOLTAGE

BACKGROUND OF THE INVENTION

1. Field of the Invention

The present invention relates to a charger system, a charging method and a secondary battery system, and more particularly, suitably applied to a charger system, a charging method and a secondary battery system in which a secondary battery is charged using electric power given from an AC power source.

2. Description of the Related Art

The demand of portable compact electronic appliances which are exemplified by small-sized headphone stereos, VTRs incorporated with cameras, and mobile communication terminals has been increasing. These compact electronic appliances use secondary batteries having large capacities as power sources, and the secondary batteries can be charged by being supplied with charging currents from associated charger systems when power of the secondary batteries is lowered.

In FIG. 1, numeral 1 shows a charger system, in which a secondary battery 5 is charged using electric power obtained from an AC power source 2. In other words, the charger system 1 inputs AC power given from the AC power source 2 into a transformer 3. The transformer 3 which is composed of a primary coil L1 and a secondary coil L2 sends out a desired voltage after dividing the voltage of the given AC power in accordance with a ratio between the respective numbers of windings of the primary coil L1 and the secondary coil L2. Further, the charger system 1 converts the AC power of the desired voltage into DC power by rectification with a diode D1 and smoothing with a capacitor C1. Furthermore, the charger system 1 prepares a predetermined charging standard voltage or a predetermined charging standard current by performing a constant current/constant voltage processing on the thus obtained DC power with a charging control section 4. The charger system 1 charges the secondary battery 5 with stable DC power thus obtained.

By the way, in the charger system 1 configured as described above, a DC voltage is extracted by rectifying an AC voltage with the diode D1 and moreover, pulsating components are eliminated from the DC voltage with the capacitor C1, and then the secondary battery 5 is charged by supplying the obtained DC voltage. However, in the case where a secondary battery having a large capacity is used as a power source, a high current must be supplied as a charging current for charging the secondary battery and the capacitor C1 must have a large capacitance for smoothing such a high charging current.

However, external dimensions of capacitors generally tend to be large in proportion to their capacitance values. Accordingly, in the charger system which has the capacitor C1 having such a large capacitance value, its miniaturization is a difficult in that a volume for placing the capacitor C1 has to be reserved. In addition, such a high charging current has another problem in that heat is generated by the capacitor C1.

SUMMARY OF THE INVENTION

In view of the foregoing, an object of this invention is to provide a charger system, a charging method and a secondary battery system in which smoothing capacitors can be minimized further.

The foregoing object and other objects of the invention have been achieved by the provision of a charger system which comprises a rectifier diode for rectifying an inputted AC voltage into a DC voltage, a smoothing capacitor having high impedance as compared with a secondary battery, for smoothing the DC voltage outputted from the rectifier diode, charging control means for receiving the DC voltage outputted from the smoothing capacitor and supplying a predetermined constant voltage to the secondary battery, switch means connected in parallel with the charging control means, for switching an opening/closing state in accordance with a control signal, detecting means for detecting a terminal voltage of the secondary battery, and switch control means for sending a control signal in accordance with the detection result of the detecting means, and for switching the switch means to the closing state to supply the DC voltage to the secondary battery via the switch means when the terminal voltage is lower than a predetermined charging standard voltage, or otherwise for switching the switch means to the opening state to supply the DC voltage to the secondary battery via the charging control means when the terminal voltage has reached the predetermined charging standard voltage.

A charging control is performed so that the DC voltage is given directly to the secondary battery during a period of time when the terminal voltage is lower than the predetermined charging standard voltage and the constant voltage is maintained only during a period of time after the terminal voltage has reached the predetermined charging standard voltage, so that the increase of pulsating components in the DC voltage can be nearly disregarded before the terminal voltage reaches the charging standard voltage because the voltage level is low and, further, the increase of pulsating components can be nearly disregarded similarly after the terminal voltage has reached the charging standard voltage because the constant voltage is maintained by the charging control.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) First Embodiment

Figure 1:
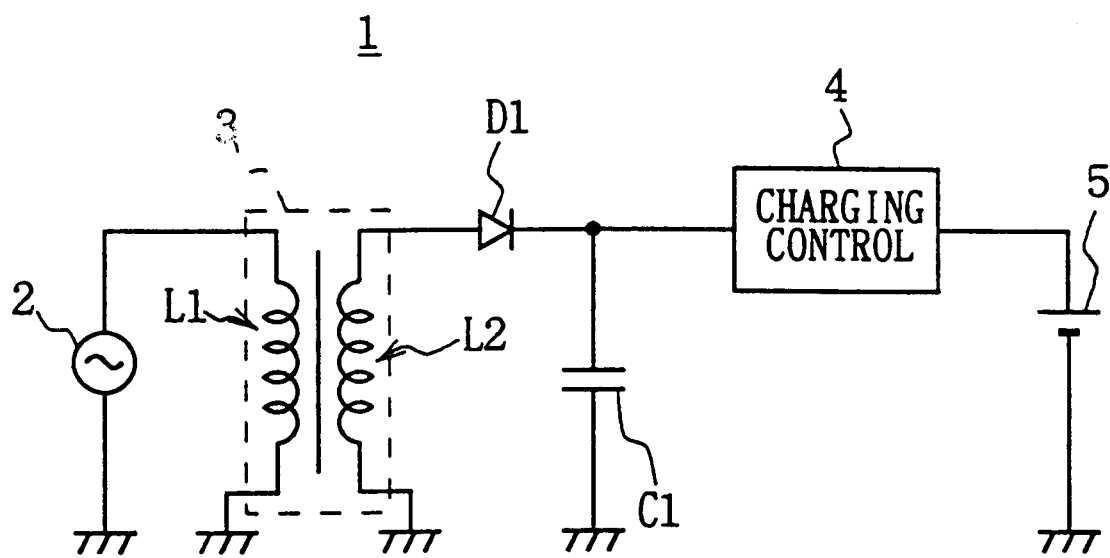
FIG. 1 is a block diagram illustrating a configuration of a conventional charger system.
Figure 2:
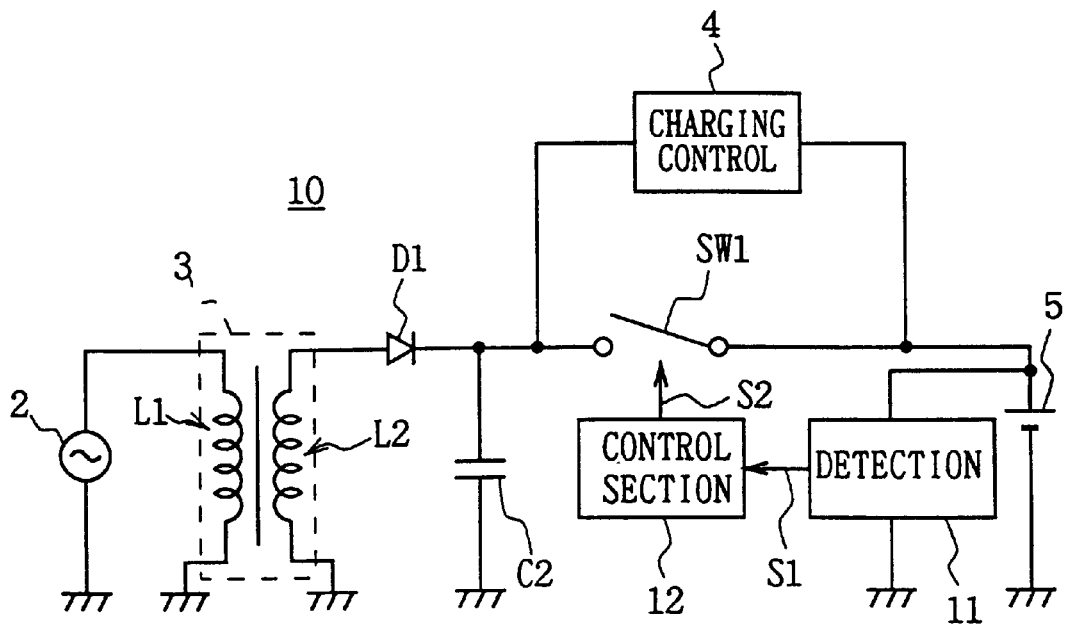
FIG. 2 is a block diagram illustrating a configuration of a charger system according to a first embodiment of the present invention.

In FIG. 2 in which the same reference numerals are applied to parts corresponding to FIG. 1, numeral 10 shows a charger system as a whole, which has a configuration similar to that of the charger system 1 except that a capacitor C2 is disposed in place of the capacitor C1, a switch SW1 is connected in parallel with an electric path between the capacitor C2 and a secondary battery 5, and a voltage detector section 11 for detecting a terminal voltage of the secondary battery 5 and a switch control section 12 for performing switching control of the switch SW1 in accordance with the voltage detection result are disposed.

In the charger system 10, a capacitor which has a sufficiently high impedance as compared with an internal impedance of the secondary battery 5 is selected as the capacitor C2 and this capacitor is disposed for smoothing DC power rectified by a diode D1. Accordingly, in the charger system 10, most of DC current obtained through the diode D1 flows to the side of the secondary battery 5, whereas only a portion of the DC current flows to the capacitor C2. For example, in the case where the internal impedance of the secondary battery 5 is represented by Z1 and the impedance of the capacitor C2 is three time as high as Z1, three quarters of the charging current supplied through the diode D1 flows to the secondary battery 5 and only a quarter of the current flows to the capacitor C2.

Further, the charger system 10 is provided with the voltage detector section 11 connected in parallel with the secondary battery 5 to detect the terminal voltage of the secondary battery 5. The voltage detector section 11 judges whether or not the detected terminal voltage has reached an upper limit value of a previously set charging standard voltage, and supplies a detection signal S1 to the switch control section 12 when a detected value has reached the upper limit value of the charging standard voltage. The switch control section 12 is configured to give a control signal S2 to the switch SW1 which is connected in parallel with a charging control section 4 to control the opening/closing of the switch SW1 in accordance with whether or not the detection signal S1 is inputted. When the detection signal S1 is not given, i.e., when the terminal voltage of the secondary battery 5 is lower than the upper limit value of the predetermined charging standard voltage, the switch control section 12 sends the control signal S2 to switch the switch SW1 to the closing state. Further, when the detection signal S1 is given, i.e., when the terminal voltage of the secondary battery 5 has reached the predetermined charging standard voltage, the switch control section 12 sends the control signal S2 to switch the switch SW1 to the opening state. Accordingly, the switch control section 12 chooses between an electric path through the charging control section 4 and an electric path through the switch SW1 as an induction path for the charging current to be supplied to the secondary battery 5. Note that, for example, a transistor element may be used as the switch SW1.

Further, the aforementioned charging standard voltage is selected in accordance with a range of the charging voltages which is required for quick charge of the secondary battery 5. The upper limit value of the charging standard voltage is a terminal voltage in a condition where the secondary battery 5 is fully charged, and it cannot be charged any longer in this condition. Further, the secondary battery 5 cannot be also charged when the terminal voltage is lower than a lower limit of the charging standard voltage because a short-circuit may be caused in the secondary battery 5. Therefore, the charger system 10 is configured to supply the charging voltage to the secondary battery 5 within a range of the charging standard voltage.

Figure 3:
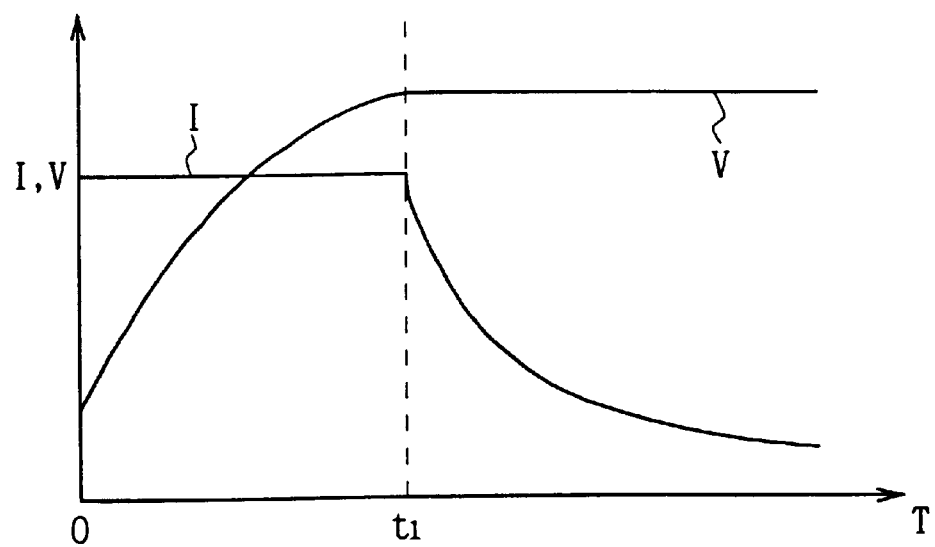
FIG. 3 is a schematic diagram explaining variations of current and voltage during charging.

Here, as shown in FIG. 3, a charger system generally charges a secondary battery by supplying a constant charging current for a period of time from a charging start time to a time t1. During the period of time, the terminal voltage of the secondary battery is gradually increased as the charging proceeds. When the terminal voltage of the secondary battery has reached the upper limit of the charging standard voltage at the time t1, the charger system switches the charging control to the constant voltage control to perform the charging with a constant voltage after the time t1. Accordingly, the charging current to be supplied to the secondary battery is gradually decreased after the time t1. The charger system 10 is configured so as to switch the induction path for the charging current at the switching time from the constant current control to the constant voltage control, and performs only the constant voltage control with the charging control section 4.

Figure 4:
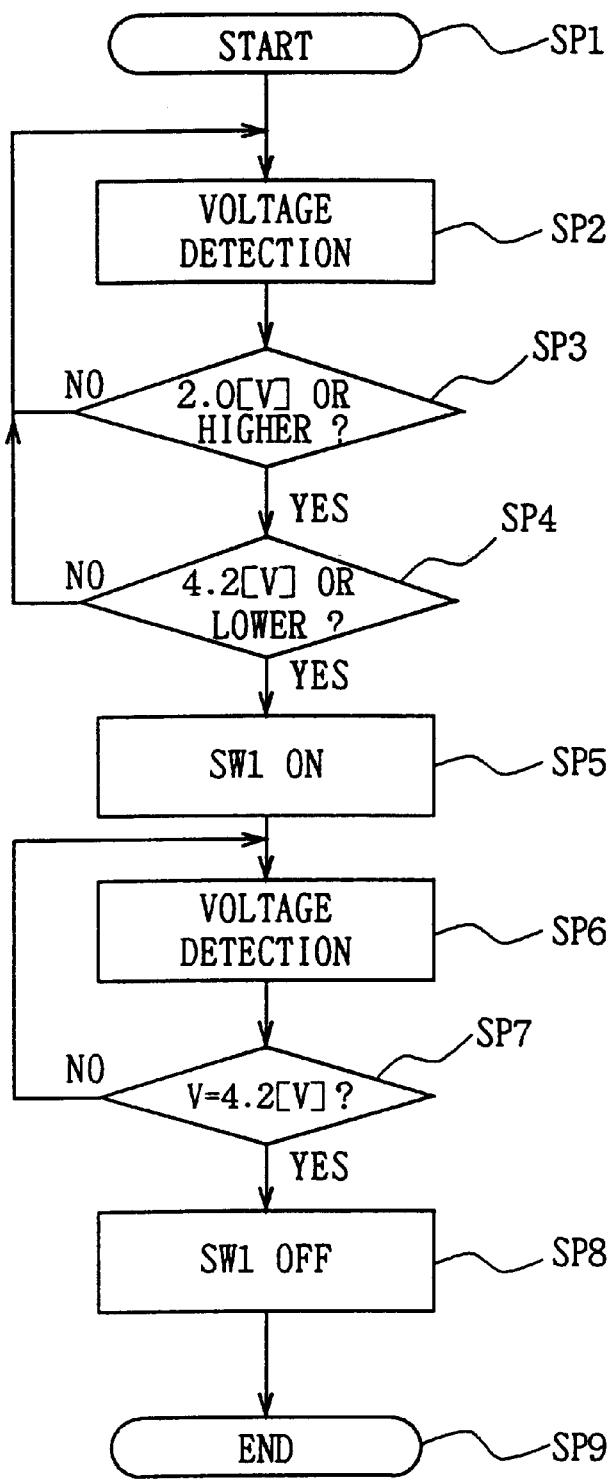
FIG. 4 is a flowchart explaining a charging control procedure according to the first embodiment.

The charger system 10 performs the switching control of the aforementioned induction path for the charging current according to a procedure shown in FIG. 4. Note that the description will be made assuming that the charging standard voltage ranges from 2.0 to 4.2 [V]. After starting the charging, the charger system 10 starts the procedure at step SP1. Then, at step SP2, the charger system 10 detects a charging voltage to be given to the secondary battery 5 with the voltage detector section 11. Here, the switch SW1 is set in an opening state as its initial state. At step SP3, the charger system 10 judges whether or not a detected voltage value is higher than the lower limit of the charging standard voltage. The charger system 10 proceeds to step SP4 when the detected value is 2.0[V] or higher which is the lower limit value of the charging standard voltage, or otherwise returns to step SP2 to continue the voltage detection when the detected value is lower than 2.0[V]. In this case, the charging current cannot be supplied to the secondary battery 5 because the charging voltage is lower than the lower limit of the charging standard voltage. Therefore, the charger system 10 stops supplying charging power to the secondary battery 5 with the charging control section 4 until the charging voltage becomes 2.0[V] or higher.

Next, at step SP4, the charger system 10 judges whether or not the detected voltage value is lower than the upper limit of the charging standard voltage. The charger system 10 proceeds to step SP5 when the detected value does not exceed 4.2[V] which is the upper limit value of the charging standard voltage, or otherwise return to step SP2 to continue the voltage detection when the detected value is higher than 4.2[V]. At step SP5, the charger system 10 switches the switch SW1 to the closing state and starts supplying the charging current to the secondary battery 5 through the switch SW1. As described above, the charger system 10 judges whether or not the charging voltage is within the predetermined range of the charging standard voltage at steps SP2 to SP4, and gives the charging current to the secondary battery 5 by closing the switch SW1 when the charging voltage is within the predetermined range.

After starting supplying the charging current to the secondary battery 5 as described above, the charger system 10 detects the charging voltage again at step SP6. At step SP7, the charger system 10 judges on the basis of a detection result whether or not the charging voltage has reached 4.2[V]. The charger system 10 proceeds to step SP8 when the charging voltage has reached 4.2[V], or otherwise returns to step SP6 to continue the voltage detection. When the charging voltage has reached 4.2[V], at step SP8, the charger system 10 switches the switch SW1 to the opening state to change the supply of the charging current to the secondary battery 5 through the switch SW1 to the supply through the charging control section 4.

In the aforementioned configuration, the charger system 10 selects the capacitor C2 having high impedance as compared with internal impedance of the secondary battery 5 as a capacitor for smoothing the DC power obtained by the rectification with the diode D1. Accordingly, most of the current outputted from the diode D1 flows to the side of the secondary battery 5 having low impedance, whereas only a portion of the current flows to the side of the capacitor C2 having high impedance. Therefore, the charger system 10 is capable of limiting the current flow to the smoothing capacitor side to a small amount as compared with the conventional amount, thereby allowing a capacitor having a capacitance value smaller than that of the conventional capacitor C1 to be provided as the capacitor C2.

Further, the charger system 10 is provided with the voltage detector section 11, the switch control section 12, and the switch SW1, and when the charging voltage is lower than the charging standard voltage, closes the switch SW1 to supply the charging current to the secondary battery 5 through the electric path on the side of the switch SW1 connected in parallel with the charging control section 4. On the other hand, when the charging voltage has reached the charging standard voltage, the charger system 10 opens the switch SW1 to supply the charging current to the secondary battery 5 through the charging control section 4. In this case, the charging control section 4 performs the constant voltage control on the charging power to supply the charging current to the secondary battery 5 while maintaining the charging standard voltage. Before the time t1, the charger system 10 supplies the charging current to the secondary battery 5 not through the charging control section 4 but directly through the switch SW1 because the charging voltage has not reached the predetermined charging standard voltage.

That is, the charger system 10 supplies the charging power directly to the secondary battery 5 before the time t1. In this time, the charging control section 4 does not perform the constant current control, and the charging current increases as the terminal voltage of the secondary battery 5 increases. Therefore, even in the case where the smoothing capacitor C2 has a small capacity and pulsating components increase, both the current and the voltage do not increase over the predetermined standard values because of the voltage direction section 11. Further, when the charging proceeds to the time t1 and the charging voltage reaches the charging standard voltage (FIG. 3), the charger system 10 opens the switch SW1 and supplies the charging current to the secondary battery 5 through the charging control section 4 in order to prevent the voltage from further increasing. Accordingly, the charging voltage is maintained at a constant voltage by the constant voltage control of the charging control section 4 after the time t1. Therefore, even in the case where the smoothing capacitor C2 has a small capacity and the pulsating components increase, both the current and the voltage do not increase over the predetermined standard values because of the voltage detection section 11 and the control section 10 as in the case described above.

According to the aforementioned configuration, in the case where the capacitor C2 having high impedance as compared with the internal impedance of the secondary battery 5 is selected as a capacitor for smoothing the charging current and the switch SW1 is connected in parallel with the charging control section 4 and the charging voltage does not reach the charging standard voltage, the switch SW1 is closed to supply the charging current to the secondary battery 5 through the electric path on the switch SW1 side and then, in the case where the charging voltage has reached the charging standard voltage, the switch SW1 is opened to supply the charging current to the secondary battery 5 through the charging control section 4, so that an amount of the charging current to flow into the capacitor C2 can be limited because of the impedance difference of the two, thereby making it possible to use a capacitor having a small capacity as compared with a conventional capacitor and minimize a charger system.

(2) Second Embodiment

Figure 5:
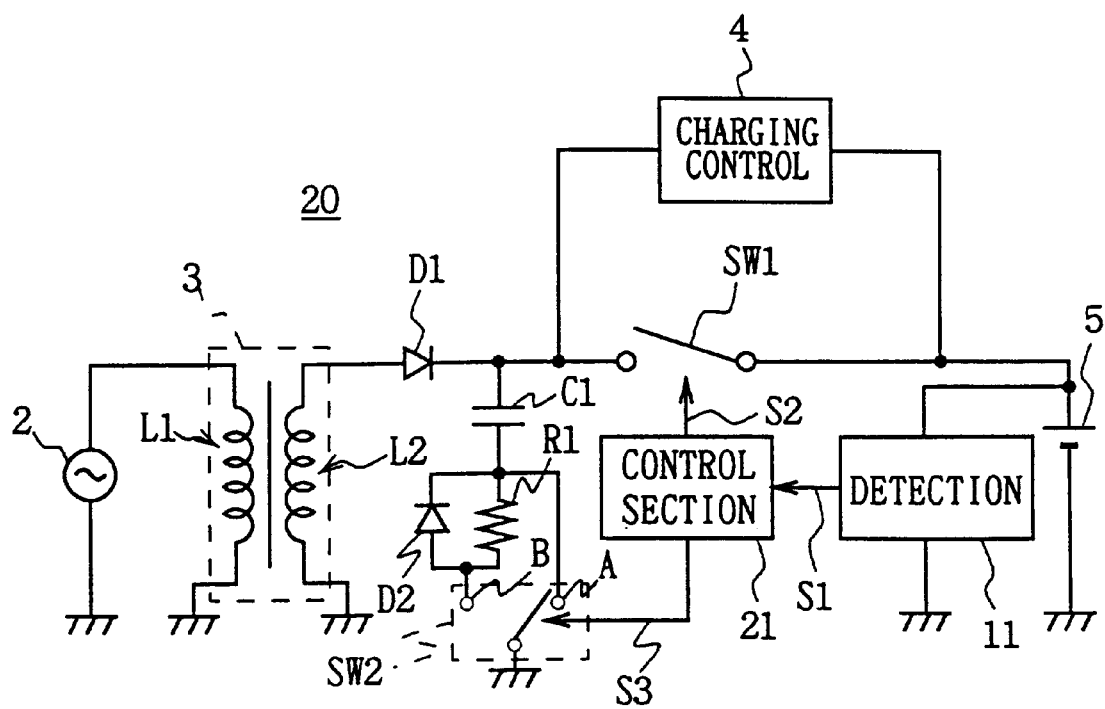
FIG. 5 is a block diagram illustrating a configuration of a charger system according to a second embodiment of the present invention.

In FIG. 5 in which the same reference numerals are applied to parts corresponding to FIG. 1, numeral 20 shows a charger system, which has a configuration similar to that of the charger system 1 except that a switch SW1 is connected in parallel on an electric path between a capacitor C1 and a secondary battery 5, a resistor element R1, a diode D2 and a terminal A are connected in series and commonly to a ground side terminal of the capacitor C1, the other ends of the resistor element R1 and the diode D2 are connected commonly to a terminal B, a switch SW2 is disposed for connecting the terminal A or B to a ground potential, and a voltage detector section 11 to detect a terminal voltage of the secondary battery 5 and a switch control section 21 to perform switching control of the switches SW1 and SW2 in accordance with the voltage detection result are disposed. Note that, the switches SW1 and SW2 may be implemented, for example, using transistor elements.

In the charger system 20, the terminal A, one end of the resistor element R1 and one end of the diode D2 are connected commonly to the grounding end of the capacitor C1. Further, the other ends of the resistor element R1 and the diode D2 are connected commonly to the terminal B. Furthermore, the charger system 20 comprises the switch SW2 which is connected between the terminals A, B and the ground potential, and connects the capacitor C1 to the ground potential directly or via the resistor element R1 or the diode D2 by switching the connection of the switch SW2.

Furthermore, the charger system 20 comprises the switch control section 21 for controlling opening/closing states of the switch SW1, which is connected in parallel with the charging control section 4, and the switch SW2, which connects the capacitor C1 to the ground potential. Specifically, in accordance with a detection signal S1 indicating a detection result of the voltage detector section 11, the switch control section 21 sends a control signal S2 to control the opening/closing state of the switch SW1 and sends a control signal S3 to control the opening/closing state of the switch SW2.

Figure 6:
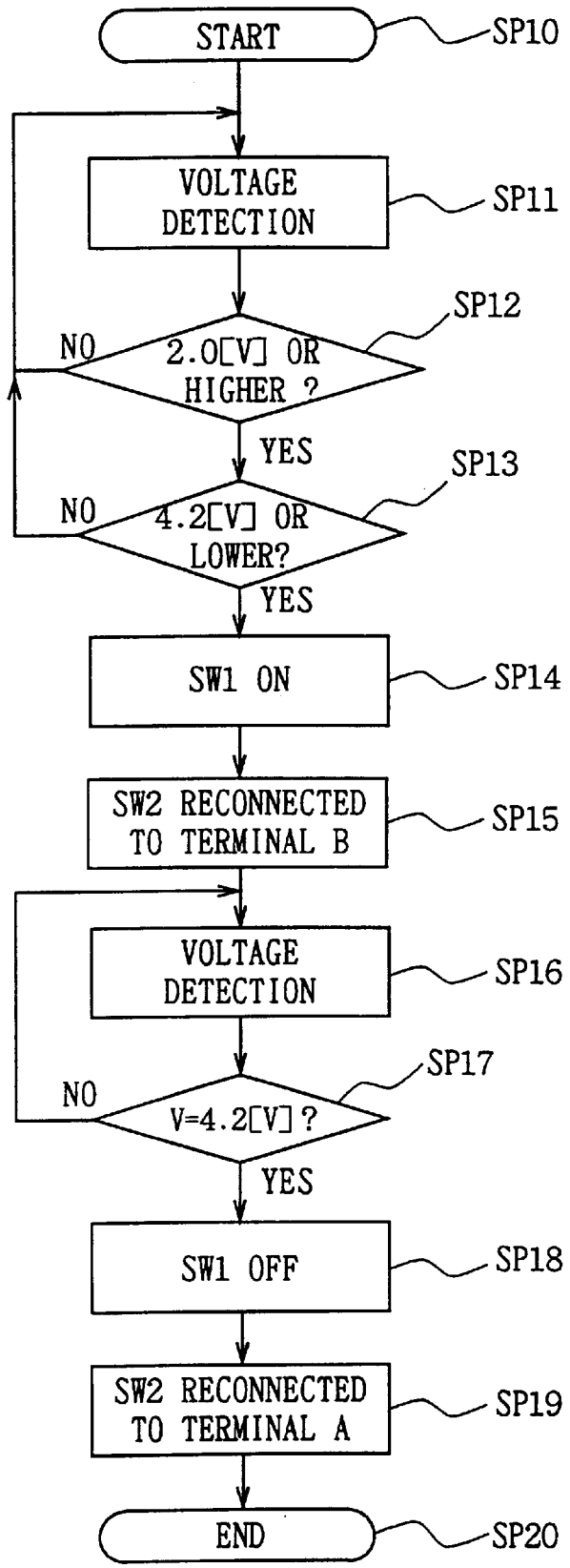
FIG. 6 is a flowchart explaining a charging control procedure according to the second embodiment.

The charger system 20 performs the switching controls of the switches SW1 and SW2 according to a procedure described below. Note that, the description will be made assuming that a charging standard voltage ranges from 2.0 to 4.2 [V]. As shown in FIG. 6, the charger system 20 starts the procedure at step SP10 and then, at step SP11, detects a charging voltage to be supplied to the secondary battery 5 with the voltage detector section 11. The charger system 20 gives a detection signal S1 indicating the detection result to the switch control section 21 and then, at steps SP12 and SP13, judges whether or not the charging voltage is within the predetermined range of the charging standard voltage.

At step SP12, the charger system 20 proceeds to step SP13 when the detected value is 2.0 [V] or higher which is a lower limit of the charging standard voltage or otherwise, returns to step SP11 to continue the voltage detection when the charging voltage is lower than 2.0[V]. When the charging voltage is lower than the lower limit of the charging standard voltage, the charging voltage cannot be supplied to the secondary battery 5. Therefore, the charger system 20 stops supplying charging power to the secondary battery 5 with the charging control section 4 until the charging voltage becomes 2.0[V] or higher. Note that, the switch SW1 is set to the opening state at this time.

Next, at step SP13, the charger system 20 judges whether or not a detected voltage value is lower than an upper limit of the charging standard voltage. The charger system 20 proceeds to step SP14 when the detected value is lower than 4.2[V] which is the upper limit value of the charging standard voltage, or otherwise returns to step SP11 to continue the voltage detection when the detected value is 4.2[V] or higher. Sequentially, at step SP14, the charger system 20 switches the switch SW1 to a closing state and starts supplying charging current to the secondary battery 5 through the switch SW1. At step SP15, the charger system 20 reconnects the switch SW2 to the terminal B to connect the capacitor C1 to the ground potential via the resistor element R1 and the diode D2. As described above, at steps SP11 to SP13, the charger system 20 judges whether or not the charging voltage is within the range of the charging standard voltage. When the charging voltage is within the range, the charger system 20 closes the switch SW1 to supply the charging current to the secondary battery 5, and reconnects the switch SW2 to the terminal B to connect the capacitor C1 to the ground potential via the resistor element R1 and the diode D2.

After starting supplying the charging current to the secondary battery 5 as described above, the charger system 20 detects the charging voltage again at step SP16. At step SP17, the charger system 20 judges based on a detection result whether or not the charging voltage has reached 4.2[V]. The charger system 20 proceeds to step SP18 when the charging voltage has reached 4.2[V], or otherwise returns to step SP16 to continue the voltage detection. When the charging voltage has reached 4.2[V], the charger system 20 switches the switch SW1 to an opening state at step SP18, thereby switching the supply of the charging current to the secondary battery 5 through the switch SW1 to the supply through the charging control section 4. Further, at step SP19, the charger system 20 reconnects the switch SW2 to the terminal A to connect the capacitor C1 directly to the ground potential.

According to the aforementioned configuration, in the charger system 20, the capacitor C1 which smoothes the DC power obtained by the rectification with the diode D1 is connected directly to the terminal A or to the terminal B via the resistor element R1 and the diode D2 in order to connect the capacitor C1 to the ground potential via the switch SW2, and performs switching control of the switch SW2 in accordance with a voltage detection result in order to perform the switching control between the connection of the capacitor C1 to the ground potential directly or via the resistor element R1.

As described above, When the charging voltage is within the range of the charging standard voltage, the charger system 20 supplies the aforementioned DC power directly to the secondary battery 5 by switching the switch SW1 to a closing state and moreover, connects the capacitor C1 to the ground potential via the resistor element R1 by reconnecting the switch SW2 to the terminal B, so that the impedance of the resistor element R1 makes impedance of the capacitor C1 equivalently high as compared with impedance of the secondary battery 5, thereby being capable of limiting an amount of the charging current to be supplied to the capacitor.

The conventional charger system uses the capacitor C1 having low impedance as compared with the secondary battery 5 and allows a lot of current to flow into the capacitor C1 as compared with the charging current to be supplied to the secondary battery 5, so that the capacitor C1 requires an element having a larger capacitance as the amount of current to be supplied to the secondary battery 5 increases. The charger system 20 is capable of limiting the amount of the charging current to flow into the capacitor C1 by making the impedance of the capacitor C1 equivalently high as compared with impedance of the secondary battery 5 as described above, thereby making it possible to select an element having a small capacity as the capacitor C1 and to minimize the capacitor C1.

Further, the impedance of the capacitor C1 is equivalently increased by the resistor element R1, so that in the case, for example, where a battery having a small capacity and high impedance is used as the secondary battery or where the impedance of the secondary battery 5 is increased due to deterioration with time, it is possible to cope with the case by replacing the resistor element R1 with a member having higher resistance.

Note that, when the charging of the secondary battery 5 proceeds to a stage where the charging voltage reaches the upper limit of the charging standard voltage, the charger system 20 switches the switch SW1 to an opening state to supply the charging current to the secondary battery 5 through the charging control section 4. At this stage, the charger system 20 reconnects the switch SW2 to the terminal A, thereby connecting the capacitor C1 directly to the ground potential. Since an amount of the charging current is gradually reduced by the constant voltage control of the charging control section 4, an amount of the current to flow into the capacitor C1 is also reduced. Accordingly, the amount of the current to flow into the capacitor C1 cannot increase even if impedance of the capacitor C1 is lowered by connecting it directly to the ground potential.

According to the aforementioned configuration, the switch SW1 is connected in parallel with the charging control section 4 and the switch SW2 is disposed between the capacitor C1 and the ground potential, and the switches of the switch SW1 and the switch SW2 are controlled in accordance with a value of the charging voltage to be supplied to the secondary battery 5, and when the charging voltage is within the range of the charging standard voltage, the charging current is supplied to the secondary battery 5 through the switch SW1 and the capacitor C1 is connected to the ground potential via the resistor element R1 by switching the connection of the switch SW2, thereby being capable of limiting an amount of the current to flow into the capacitor C1 by equivalently increasing the impedance of the capacitor C1 with the resistor element R1 until the charging voltage reaches the charging standard voltage, that is, while a lot of charging current is supplied, thus making it possible to minimize the charger system by using a capacitor having a small capacitance as compared with the conventional capacitor.

(3) Third Embodiment

Figure 7:
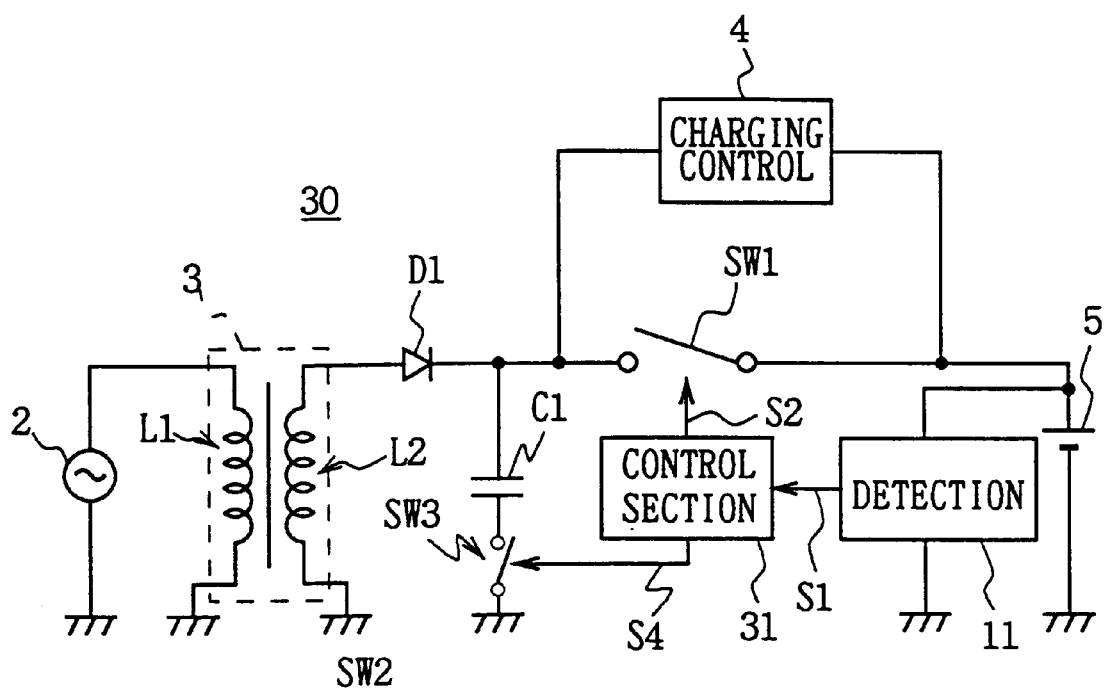
FIG. 7 is a block diagram illustrating a configuration of a charger system according to a third embodiment of the present invention.

In FIG. 7 where the same reference numerals are applied to parts corresponding to FIG. 1, numeral 30 shows a charger system as a whole, which has a configuration similar to that of the charger system 1 except that a switch SW1 is connected in parallel in an electric path between a capacitor C1 and a secondary battery 5, a switch SW3 is disposed between the capacitor C1 and a ground potential, and a voltage detector section 11 to detect a terminal voltage of the secondary battery 5 and a switch control section 31 to control the switch SW1 and the switch SW3 in accordance with a voltage detection result. Note that, for example, transistor elements are used as the switches SW1 and SW3.

The charger system 30 is provided with the voltage detector section 11 connected in parallel with the secondary battery 5 for detecting a value of a charging voltage to be supplied to the secondary battery 5, and informs the switch control section 31 of a detection result by using a detection signal S1. The switch control section 31 sends a control signal S2 and a control signal S4 in accordance with the voltage detection result given by the detection signal S1, thereby controlling the switches SW1 and SW3.

In addition, the charger system 30 is provided with the switch SW1 connected in parallel with a charging control section 4, so that the charging system 30 supplies the charging current to the secondary battery 5 through the switch SW1 by switching the switch SW1 to a closing state and, moreover, supplies the charging current to the secondary battery 5 through the charging control section 4 by switching the switch SW1 to an opening state. By controlling the switch SW1 as described above, the charger system 30 gives DC power sent from a diode D1 to the secondary battery 5 directly and supplies the charging current subjected to a constant voltage control to the secondary battery 5 through the charging control section 4. Further, the charger system 30 in which the switch SW3 is disposed between the capacitor C1 and the ground potential connects and disconnects the capacitor C1 to and from the ground potential by switching between an opening/closing state by the switch control section 31.

Figure 8:
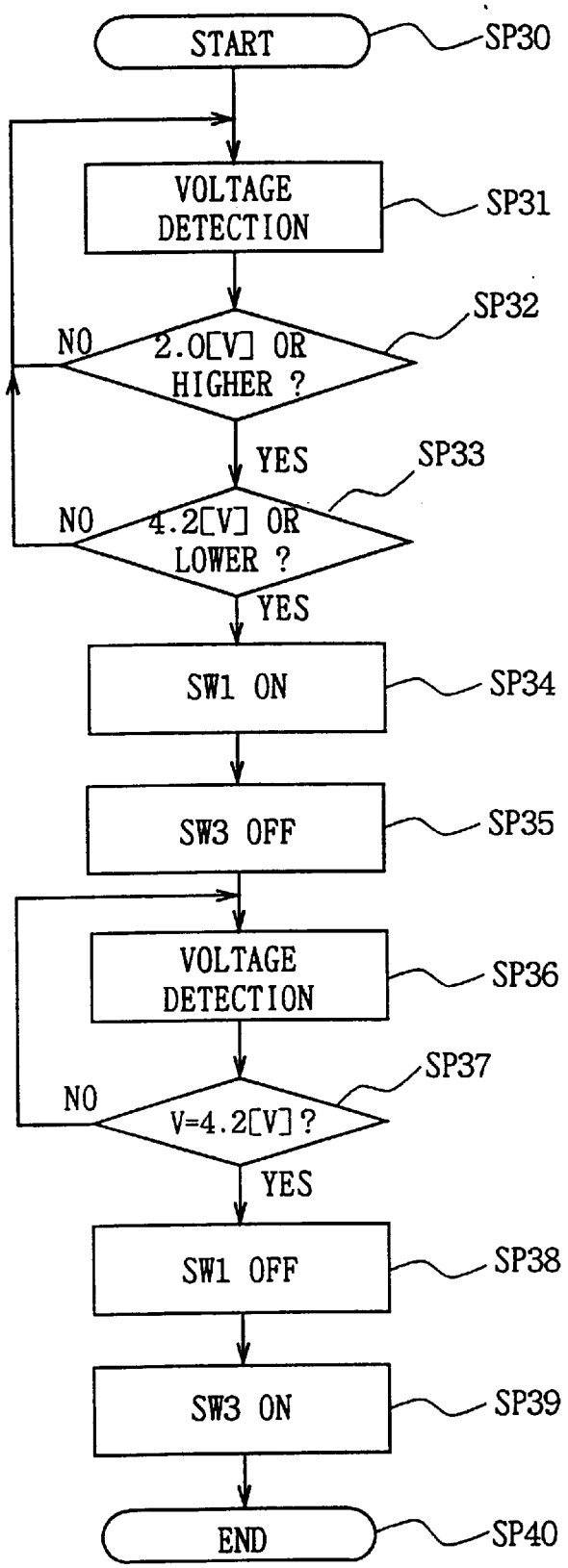
FIG. 8 is a flowchart explaining a charging control procedure according to the third embodiment.

The charger system 30 controls the switches SW1 and SW3 according to a procedure described below. Note that, the description will be made assuming that a charging standard voltage ranges from 2.0 to 4.2 [V]. As shown in FIG. 8, the charger system 30 starts the procedure at step SP30, and at step SP31, detects the charging voltage to be supplied to the secondary battery 5. At step SP32, the charger system 30 judges whether or not the charging voltage is 2.0[V] or higher, and proceeds to step SP33 when the charging voltage is 2.0[V] or higher, or otherwise returns to step SP31 to continue the voltage detection when the charging voltage is lower than 2.0[V]. Here, when the charging voltage is lower than the lower limit of the charging standard voltage, the charging voltage cannot be supplied to the secondary battery 5. Therefore, the charger system 30 stops supplying charging power to the secondary battery 5 with the charging control section 4 until the charging voltage becomes 2.0[V] or higher. At this time, the switch SW1 is set to an opening state.

At step SP33, the charger system 30 judges whether or not a detected voltage value is lower than the upper limit of the charging standard voltage. The charger system 30 proceeds to step SP34 when the detected value is 4.2[V] or lower which is the upper limit of the charging standard voltage, or otherwise returns to step SP31 to continue the voltage detection when the detected value is higher than 4.2[V]. Sequentially, at step SP34, the charger system 30 switches the switch SW1 to a closing state and starts supplying the charging current to the secondary battery 5 through the switch SW1. At step SP35, the charger system 30 switches the switch SW3 to an opening state to disconnect the capacitor C1 from the ground potential. As described above, at steps SP31 to SP33, the charger system 30 judges whether or not the charging voltage is within the range of the charging standard voltage, and supplies the charging current to the secondary battery 5 by closing the switch SW1 and disconnects the capacitor C1 from the ground potential by opening the switch SW3 when the charging voltage is within the range of the charging standard voltage.

After starting supplying the charging current to the secondary battery 5 as described above, the charger system 30 detects the charging voltage again at step SP36. At step SP37, the charger system 30 judges based on a detection result whether or not the charging voltage has reached 4.2[V]. The charger system 30 proceeds to step SP38 when the charging voltage has reached 4.2[V], or otherwise returns to step SP36 to continue the voltage detection. When the charging voltage has reached 4.2[V], the charger system 30 switches the switch SW1 to an opening state at step SP38, thereby switching the supply of the charging current to the secondary battery 5 through the switch SW1 to the supply through the charging control section 4. Further, at step SP39, the charger system 30 connects the capacitor C1 to the ground potential by closing the switch SW3.

According to the aforementioned configuration, the charger system 30 connects the capacitor C1 which smoothes the DC power obtained by rectification of the diode D1 to the ground potential via the switch SW3 and controls the switch SW3 in accordance with the voltage detection result, thereby connecting and disconnecting the capacitor C1 to and from the ground potential. When the charging voltage is within the range of the charging standard voltage, the charger system 30 supplies the aforementioned DC power directly to the secondary battery 5 by switching the switch SW1 to a closing state and moreover, disconnects the capacitor C1 from the ground potential by switching the switch SW3 to an opening state. Since the charging current is high while the charging voltage is within the range of the charging standard voltage, the switch SW3 is opened in accordance with the voltage detection result as described above, so that the charger system 30 can stop supplying the charging current to the capacitor C1 while high current flows through the electric path. Accordingly, the charger system 30 allows an element having a small capacity to be selected as the capacitor C1, thus the capacitor C1 can be minimized.

Note that, when the secondary battery 5 is charged until the charging voltage reaches the upper limit of the charging standard voltage, the charger system 30 switches the switch SW1 to an opening state to supply the charging current to the secondary battery 5 through the charging control section 4. At this time, the charger system 30 connects the capacitor C1 to the ground potential by switching the switch SW3 to a closing state. Since an amount of the charging current is gradually reduced by the constant voltage control of the charging control section 4, an amount of current to flow into the capacitor C1 is also reduced. Accordingly, even if the charging current flows into the capacitor C1 by being connected to the ground potential, a small amount of current flows, whereby a capacitor having a small capacitance is usable as the capacitor C1.

According to the aforementioned configuration, the switch SW1 is connected in parallel with the charging control section 4 and the switch SW3 is disposed between the capacitor C1 and the ground potential, and the switches SW1 and SW3 are controlled in accordance with the charging voltage given to the secondary battery 5. When the charging voltage is within the range of the charging standard voltage, the charging current is supplied to the secondary battery 5 through the switch SW1 and, moreover, the capacitor C1 is disconnected from the ground potential by switching the switch SW3 to an opening state, thereby being capable of stopping the charging current from flowing to the capacitor C1 only while a lot of charging current is being supplied through the electric path and making it possible to minimize the charger system as a whole by selecting a capacitor having a small capacitance as compared with the conventional capacitor.

(4) Other Embodiments

Note that, in the aforementioned second embodiment, the switch SW2 is connected in series between the capacitor C1 and the ground potential, the resistor element R1 is connected in parallel with the switch SW2, and the switch SW2 connects the capacitor C1 to the ground potential directly or via the resistor element R1 in accordance with the terminal voltage of the secondary battery 5. However, the present invention is not limited thereto and a plurality of resistor elements having different resistance values can be connected commonly to a connecting end on the side of the ground potential of a capacitor and a current detector section to detect an amount of charging current to be supplied to the secondary battery 5 can be disposed so that the capacitor is connected to the ground potential via an adequate resistor element by selecting a resistor element having a resistance value corresponding to a detected amount of the charging current and connecting it to a switch connected in series with the ground potential when the terminal voltage of the secondary battery 5 has reached the charging standard voltage. Accordingly, since an amount of the charging current to flow into the capacitor can be controlled by adequately varying impedance on the side of the capacitor in accordance with the amount of current to be supplied to the secondary battery, a capacitor having a smaller capacitance can be used.

Further, for example, a variable resistor element is disposed between a capacitor and the ground potential in place of the plurality of resistor elements, so that impedance of the capacitor can be varied equivalently, adequately and stepwise or continuously by varying the resistor value in accordance with an amount of the charging current. This configuration makes it possible to simplify a configuration of a charger system.

Further, in the aforementioned first to third embodiments, the terminal voltage of the secondary battery 5 is detected to control the switches SW1, SW2 and SW3 in accordance with the detection results. However, the present invention is not limited thereto and a current detector section to detect an amount of charging current to be supplied to the secondary battery 5 can be disposed in place of the voltage detector section so that switches can be controlled in accordance with detection results of the amount of current.

Further, in the aforementioned first to third embodiments, the detection signal S1, the control signals S2 and S3 are sent directly. However, the present invention is not limited thereto and a time constant circuit can be disposed between an output side and an input side of each signal so that the signal is supplied to the input side through the time constant circuit. This configuration stabilizes an operation of each section.

Further, in the aforementioned first to third embodiments, the AC power to be supplied from the AC power source 2 through the transformer 3 is lowered. However, the present invention is not limited thereto and the primary coil L1 and the secondary coil L2 can have no contact so that power to be sent from an AC power source is transferred from the primary coil to the secondary coil by electromagnetic induction.

Furthermore, in the aforementioned second and third embodiments, when the charging voltage has reached the upper limit of the charging standard voltage, the charging current is supplied to the secondary battery 5 through the charging control section 4 by switching the switch SW1 to an opening state. However, the present invention is not limited thereto and a second charging control section to perform a constant voltage control with a voltage $\Delta V$ lower than that of the constant voltage control by the charging control section 4 can be disposed in series with the charging control section 4 and a switch section to switch to a supply of the charging current through the charging control section 4 or the second charging control section when the switch SW1 is switched to an opening state can be disposed so that the second charging control section performs the constant voltage control during a definite period of time after the charging voltage has reached the upper limit of the charging standard voltage and then this control is switched to the constant voltage control by the charging control section 4.

When the charging voltage has reached the upper limit of the charging standard voltage and the switching is made to the supply of the charging current through the charging control section 4, an amount of current to flow into the capacitor C1 is gradually reduced by the constant voltage control by the charging control section 4. However, the amount of the charging current cannot be reduced to a sufficiently small current amount at the time of the switching. According to the aforementioned configuration, the constant voltage control is performed with the voltage $\Delta V$ lower than that of the constant voltage control by the charging control section 4 during a predetermined period of time after the charging voltage has reached the upper limit of the charging standard voltage, thereby making it possible to reduce the amount of the charging current to a sufficiently small current amount at such switching, thus a L1 more small-sized capacitor can be selected as a smoothing capacitor.

According to the present invention described above, the increase of pulsating components in the DC voltage can be nearly disregarded before the terminal voltage reaches the upper limit of the charging standard voltage because the voltage is at a low level, and in addition, similarly the increase of the pulsating components can be nearly disregarded after the terminal voltage has reached the upper limit of the charging standard voltage because the voltage is maintained at a constant level by the charging control, so that the smoothing capacitor can be minimized further by selecting an element having a small capacitance as a smoothing capacitor.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A charger system for charging a secondary battery with an AC voltage, comprising:

a rectifier diode for rectifying said AC voltage into a DC voltage;

a smoothing capacitor having high impedance as compared with an impedance of said secondary battery, for smoothing said DC voltage outputted from said rectifier diode;

charging control means for receiving said smoothed DC voltage from said smoothing capacitor and supplying a predetermined constant voltage to said secondary battery;

first switch means connected in parallel with said charging control means;

detector means for detecting a terminal voltage of said secondary battery;

switch control means for supplying a control signal to control an opening/closing state of said first switch means in accordance with a detection result of said detector means, for switching said first switch means to a closing state to supply said smoothed DC voltage to said secondary battery through said first switch means when said detected terminal voltage is lower than a predetermined charging standard voltage, and for switching said first switch means to an opening state to supply said DC voltage to said secondary battery through said charging control means when said detected terminal voltage reaches the predetermined charging standard voltage;

second switch means connected in series between said smoothing capacitor and a ground potential; and a resistor element connected in parallel with said second switch means, wherein said smoothing capacitor has one end connected to an output end of said rectifier diode and the other end connected to said ground potential, and said second switch means is controlled in accordance with said control signal to connect said smoothing capacitor to said ground potential via said resistor element when said detected terminal voltage is lower than the predetermined charging standard voltage and to connect said smoothing capacitor to said ground potential without connecting through said resistor element when said detected terminal voltage reaches the charging standard voltage.

2. The charger system according to claim 1, further comprising an induction coil connected to said rectifier diode, said induction coil including a primary coil and a secondary coil which have no contact, wherein said AC voltage is transferred by said induction coil from said primary coil to said secondary coil, and the transferred AC voltage is supplied to said rectifier diode.

3. charger system for charging a secondary battery with an AC voltage, comprising:

a rectifier diode for rectifying said AC voltage into a DC voltage;

a smoothing capacitor having high impedance as compared with an impedance of said secondary battery, for smoothing said DC voltage outputted from said rectifier diode;

charging control means for receiving said smoothed DC voltage from said smoothing capacitor and supplying a predetermined constant voltage to said secondary battery;

first switch means connected in parallel with said charging control means;

detector means for detecting a terminal voltage of said secondary battery;

switch control means for supplying a control signal to control an opening/closing state of said first switch means in accordance with a detection result of said detector means, for switching said switch means to a closing state to supply said smoothed DC voltage to said secondary battery through said first switch means when said detected terminal voltage is lower than a predetermined charging standard voltage, and for switching said first switch means to an opening state to supply said DC voltage to said secondary battery through said charging control means when said detected terminal voltage reaches the predetermined charging standard voltage; wherein said smoothing capacitor has one end connected to an output end of said rectifier diode and said charger system further comprises second switch means having one connecting end connected to a ground potential, and said switch control means controls said second switch means in accordance with said control signal to disconnect said smoothing capacitor from said ground potential when said detected terminal voltage is lower than the predetermined charging standard voltage and to connect said smoothing capacitor to said ground potential when said detected terminal voltage reaches the predetermined charging standard voltage.

4. A charging method for charging a secondary battery with an AC voltage, comprising the steps of:

rectifying said AC voltage into a DC voltage with a diode;

smoothing said DC voltage with a smoothing capacitor having high impedance as compared with an impedance of said secondary battery;

detecting a terminal voltage of said secondary battery;

supplying said smoothed DC voltage to said secondary battery when said detected terminal voltage is lower than a predetermined charging standard voltage; and supplying said DC voltage to said secondary battery while maintaining said DC voltage at a constant voltage when said detected terminal voltage reaches the predetermined charging standard voltage;

disconnecting said smoothing capacitor from a ground potential when said detected terminal voltage is lower than the predetermined charging standard voltage; and connecting said smoothing capacitor to said ground potential when said detected terminal voltage reaches the predetermined charging standard voltage.

5. A secondary battery system for charging a secondary battery with an AC voltage, comprising:

a rectifier diode for rectifying said AC voltage into a DC voltage;

a smoothing capacitor having high impedance as compared with an impedance of said secondary battery, for smoothing said DC voltage outputted from said rectifier diode;

charging control means for receiving said smoothed DC voltage from said smoothing capacitor and supplying a predetermined constant voltage to said secondary battery;

first switch means connected in parallel with said charging control means;

detector means for detecting a terminal voltage of said secondary battery; and switch control means for supplying a control signal in accordance with a detection result of said detector means to control an opening/closing state of said first switch means, for switching said first switch means to a closing state to supply said smoothed DC voltage to said secondary battery through said first switch means when said detected terminal voltage is lower than a predetermined charging standard voltage and for switching said first switch means to an opening state to supply said DC voltage to said secondary battery through said charging control means when said detected terminal voltage reaches the predetermined charging standard voltage;

second switch means connected in series between said smoothing capacitor and a ground potential; and a resistor element connected in parallel with said second switch means, wherein said smoothing capacitor has one end connected to an output end of said rectifier diode and the other end connected to said ground potential, and said second switch means is controlled in accordance with said control signal to connect said smoothing capacitor to said ground potential via said resistor element when said detected terminal voltage is lower than the predetermined charging standard voltage and to connect said smoothing capacitor to said ground potential without connecting through said resistor element when said terminal voltage reaches the predetermined charging standard voltage.

6. The secondary battery system according to claim, 5 wherein said smoothing capacitor has one end connected to an output end of said rectifier diode and the other end connected to a ground potential via a resistor element.

7. The secondary battery system according to claim 5, further comprising an induction coil connected to said rectifier diode, said induction coil including a primary coil and a secondary coil which have no contact, wherein said AC voltage is transferred by said induction coil from said primary coil to said secondary coil, and said transferred AC voltage is supplied to said rectifier diode.

8. A secondary battery system for charging a secondary battery with an AC voltage, comprising:

a rectifier diode for rectifying said AC voltage into a DC voltage;

a smoothing capacitor having high impedance as compared with an impedance of said secondary battery, for smoothing said DC voltage outputted from said rectifier diode;

charging control means for receiving said smoothed DC voltage from said smoothing capacitor and supplying a predetermined constant voltage to said secondary battery;

first switch means connected in parallel with said charging control means;

detector means for detecting a terminal voltage of said secondary battery; and switch control means for supplying a control signal in accordance with a detection result of said detector means to control an opening/closing state of said first switch means, for switching said first switch means to a closing state to supply said smoothed DC voltage to said secondary battery through said first switch means when said detected terminal voltage is lower than a predetermined charging standard voltage and for switching said first switch means to an opening state to supply said DC voltage to said secondary battery through said charging control means when said detected terminal voltage reaches the predetermined charging standard voltage; wherein said smoothing capacitor has one end connected to an output end of said rectifier diode and said secondary battery system further comprises second switch means having one connecting end connected to a ground potential, and said second switch means is controlled in accordance with said control signal to disconnect said smoothing capacitor from said ground potential when said detected terminal voltage is lower than the predetermined charging standard voltage and to connect said smoothing capacitor to said ground potential when said detected terminal voltage reaches the predetermined charging standard voltage.

* * * * *